United States Patent
Yamazaki et al.

(10) Patent No.: US 8,738,261 B2
(45) Date of Patent: May 27, 2014

(54) ACCELERATOR PEDAL APPARATUS

(75) Inventors: Shigeru Yamazaki, Kanagawa (JP);
Meguru Kashiyama, Kanagawa (JP);
Masato Kumamoto, Kanagawa (JP);
Tsuyoshi Oosawa, Kanagawa (JP);
Hiromutsu Touhachi, Kanagawa (JP)

(73) Assignee: Mikuni Corporation, Tokyo (JP)

( * ) Notice: Subject to any disclaimer, the term of this patent is extended or adjusted under 35 U.S.C. 154(b) by 105 days.

(21) Appl. No.: 13/403,035

(22) Filed: Feb. 23, 2012

(65) Prior Publication Data
US 2012/0221220 A1 Aug. 30, 2012

(30) Foreign Application Priority Data
Feb. 23, 2011 (JP) .................................. 2011-036863

(51) Int. Cl.
| | | |
|---|---|---|
| G06F 7/70 | (2006.01) | |
| G06F 19/00 | (2011.01) | |
| G06G 7/76 | (2006.01) | |
| B60T 7/22 | (2006.01) | |
| B60T 8/172 | (2006.01) | |
| B60W 10/18 | (2012.01) | |

(52) U.S. Cl.
CPC . *B60T 7/22* (2013.01); *B60T 8/172* (2013.01); *B60W 10/18* (2013.01)
USPC .......................................................... 701/70

(58) Field of Classification Search
CPC ........... B60T 8/172; B60T 7/22; B60W 10/18
USPC .......................................................... 701/70
See application file for complete search history.

(56) References Cited

U.S. PATENT DOCUMENTS

| | | | | |
|---|---|---|---|---|
| 6,542,793 | B2 * | 4/2003 | Kojima et al. ..................... 701/1 |
| 6,920,385 | B2 * | 7/2005 | Egami .............................. 701/70 |
| 6,981,486 | B2 * | 1/2006 | Yone et al. ..................... 123/399 |
| 7,076,358 | B2 * | 7/2006 | Egami .............................. 701/70 |
| 7,162,349 | B2 * | 1/2007 | Hijikata et al. .................... 701/70 |
| 7,560,826 | B2 * | 7/2009 | Hijikata et al. ................. 307/9.1 |
| 7,630,818 | B2 * | 12/2009 | Kobayashi et al. .............. 701/96 |
| 7,835,842 | B2 * | 11/2010 | Unterforsthuber .............. 701/54 |
| 8,401,734 | B2 * | 3/2013 | Honda ............................. 701/36 |
| 8,521,360 | B2 * | 8/2013 | Yamazaki et al. ............... 701/36 |
| 2003/0163240 | A1 * | 8/2003 | Egami .............................. 701/96 |
| 2003/0190996 | A1 * | 10/2003 | Yone ............................. 477/120 |
| 2010/0250085 | A1 * | 9/2010 | Sugano et al. .................. 701/70 |
| 2010/0280085 | A1 * | 11/2010 | Luthy et al. .................... 514/377 |
| 2012/0143441 | A1 * | 6/2012 | Yamazaki et al. ............... 701/36 |
| 2012/0216652 | A1 * | 8/2012 | Yamazaki et al. .............. 74/513 |

FOREIGN PATENT DOCUMENTS

JP  2004-314871  11/2004

* cited by examiner

*Primary Examiner* — Mary Cheung
*Assistant Examiner* — Frederick Brushaber (57) ABSTRACT

An accelerator pedal apparatus includes an accelerator pedal, a hysteresis generating mechanism which generates hysteresis on pedaling force, a reaction force adding mechanism which adds reaction force to push back the accelerator pedal toward a rest position, and controller which performs drive control of the reaction force adding mechanism, while the controller performs drive control of the reaction force adding mechanism so that reaction force is added during returning as well as during depressing of the accelerator pedal under predetermined conditions as the reaction force being larger than pedaling force difference between pedaling force at the depression side and pedaling force at the return side of the pedaling force hysteresis to obtain an appropriate accelerator feeling and to quickly perform danger avoidance or danger notification.

15 Claims, 9 Drawing Sheets

ACCELERATOR PEDAL APPARATUS

CROSS-REFERENCE TO RELATED APPLICATIONS

This application claims the priority benefit of Japanese Patent Application No. 2011-036863, filed Feb. 23, 2011, in the Japanese Patent Office, the disclosure of which is incorporated herein by reference.

BACKGROUND

1. Field

The present disclosure relates to an accelerator pedal apparatus applied to vehicles and the like having a drive-by-wire system, and in particular, relates to an accelerator pedal apparatus including a reaction force generating mechanism which generates reaction force (i.e. push-back force) against pedaling force of a pedal arm for danger avoidance, danger notification or the like.

2. Description of the Related Art

For an engine mounted on an automobile and the like, an accelerator pedal apparatus including a hysteresis generating mechanism to provide a hysteresis characteristic to relation between a stroke (i.e., a depression amount) and pedaling force of an accelerator pedal as pedaling force during return operation which is smaller than pedaling force during depression operation is applied to an electronically controlled throttle system (i.e., a drive-by-wire system). In the above structure, an accelerator pedal apparatus including pedaling force change means (i.e., a reaction force adding mechanism) is known which appropriately adds reaction force to pedaling force at the depression side of the accelerator pedal to obtain appropriate pedaling force in accordance with vehicle drive states while maintaining an initially-set characteristic pedaling force at the return side of the accelerator pedal regardless of the vehicle drive states. For example, see Japanese Laid-open Patent Publication No. 2004-314871.

Examples of situations to suppress depression by adding reaction force during depression operation of an accelerator pedal include a situation to improve fuel consumption by suppressing excessive depression, a situation to notify a driver that they are getting close to a vehicle in front of them during driving, and a situation to avoid or notify a driver of other danger.

The above situations are not limited only to a time during a depression operation of the accelerator pedal. Even during return operation of the accelerator pedal, there is a danger of getting too close to a vehicle in front of a driver or that smooth driving cannot be performed when the return amount is insufficient or the return operation is slow.

SUMMARY

To address the above issues, the present disclosure provides an accelerator pedal apparatus where the pedaling force has a hysteresis characteristic, the apparatus being capable of quickly performing danger avoidance or danger notification during operation (i.e., depression operation and return operation) of an accelerator pedal and being capable of preventing an irregular feeling being imparted to the driver when reaction force is added.

An accelerator pedal apparatus of the present disclosure includes an accelerator pedal, a hysteresis generating mechanism which generates hysteresis on pedaling force of the accelerator pedal, a reaction force adding mechanism which adds reaction force to push back the accelerator pedal toward a rest position, and a controller which performs drive control of the reaction force adding mechanism, while the controller performs drive control of the reaction force adding mechanism so that reaction force is added during depressing of the accelerator pedal under predetermined conditions and reaction force is added during returning of the accelerator pedal under predetermined conditions as the reaction force being larger than pedaling force difference between pedaling force at the depression side and pedaling force at the return side of the pedaling force hysteresis.

According to the above structure, it is possible to obtain pedaling force with hysteresis caused by the hysteresis generating mechanism when the pedal arm is swung between the rest position and the maximum depression position as the accelerator pedal being operated by a driver. In addition, under predetermined conditions (for example, in a case that danger avoidance, danger notification or the like is required when a vehicle in front of the driver becomes too close during vehicle driving), it is possible with driving of the reaction force adding mechanism by the controller to generate push-back force to push back the accelerator pedal against pedaling force even during return operation as well as during depression operation by the driver.

Further, in a case where reaction force is added during depression operation of the accelerator pedal (along a characteristic line at the depression side of the pedaling force hysteresis characteristic), the pedaling force follows a characteristic line at the return side of the hysteresis characteristic to which reaction force is added regardless of being during depression operation as the accelerator pedal being slightly returned by the reaction force. Here, if the added reaction force is smaller than the difference between the pedaling force at the depression side and the pedaling force at the return side, the pedaling force becomes smaller than pedaling force at the depression side to which reaction force is not added at an accelerator opening (i.e., an accelerator stroke), that is, the pedaling force characteristic line having reaction force added and the pedaling force characteristic line having reaction force not added are partially overlapped. In this case, there may be a fear that a reaction force feeling cannot be clearly recognized by the driver. Therefore, owing to that reaction force being larger than the difference between the pedaling force at the depression side and the pedaling force at the return side is added, the pedaling force becomes larger than the pedaling force at the depression side to which reaction force is not added at the position of the accelerator opening (i.e., the accelerator stroke). Accordingly, the reaction force feeling can be clearly recognized by the driver.

In the above structure, the controller may perform drive control of the reaction force adding mechanism so that reaction force to be added during depressing of the accelerator pedal is larger than reaction force to be added during returning of the accelerator pedal.

According to the above structure, in a case where reaction force is added during depression operation of the accelerator pedal, the pedaling force follows the characteristic line at the return side of the hysteresis characteristic to which reaction force is added regardless of being during depression operation as the accelerator pedal being slightly returned by the reaction force. Here, if the reaction force to be added during depression operation is equal to the reaction force to be added during return operation, it is difficult for a driver to recognize the added reaction force. However, since a reaction force larger than the reaction force to be added during return operation of the accelerator pedal is added during depression operation, the reaction force can be reliably felt during depression operation by the driver. Further, appropriate accelerator feeling can be actualized without providing a strange or irregular feeling to the driver.

In the above structure, the controller may determine after the reaction force is added whether or not reaction force is to be further added based on operational information of the accelerator pedal.

According to the above structure, when the accelerator pedal is operated to be returned after the reaction force is added, reaction force is not to be further added. In contrast, when the accelerator pedal is further depressed even after the reaction force is added, reaction force is to be further added. Accordingly, it is possible to sufficiently perform danger avoidance or to continuously perform danger notification.

In the above structure, the reaction force adding mechanism may include a torque motor which exerts rotational torque to push back the accelerator pedal as being engaged therewith, and the controller may appropriately set reaction force magnitude by adjusting drive current of the torque motor.

According to the above structure, since the torque motor is adopted for the reaction force adding mechanism, reaction force can be added with a simple control method while achieving structural simplification and the like.

The above structure may further include an operation detector which detects operation of the accelerator pedal, and then, the controller may determine based on output information of the operation detector whether the accelerator pedal is in depression operation or return operation and may perform drive control of the reaction force adding mechanism.

According to the above structure, operation of the accelerator pedal is determined whether being depression operation or being return operation based on the detection information of the operation detector, and then, reaction force adding is performed by the reaction force adding mechanism based on the determination result. Therefore, operation of the accelerator pedal can be directly reflected to reaction force adding control, so that reaction force can be accurately added at desired timing respectively during depression operation and return operation of the accelerator pedal.

The above structure may further include drive state detector which detects a vehicle drive state or an engine drive state, and the controller may perform drive control of the reaction force adding mechanism based on detection information of the drive state detector.

According to the above structure, since drive control of the reaction force adding mechanism is appropriately performed based on the various drive information (such as vehicle speed, engine speed, distance against a vehicle in front, road surface information and a drive mode) detected by the drive state detector, it is possible that danger avoidance and danger notification are quickly performed in an appropriate state and that fuel consumption is reduced without providing a feeling of strangeness to a driver.

According to the accelerator pedal apparatus with the above structure having a hysteresis characteristic on pedaling force, it is possible to quickly perform danger avoidance or danger notification during operation (i.e., depression operation and return operation) of an accelerator pedal and to prevent to provide a feeling of strangeness to a driver when reaction force is added.

BRIEF DESCRIPTION OF THE DRAWINGS

These and/or other aspects and advantages will become apparent and more readily appreciated from the following description of the embodiments, taken in conjunction with the accompanying drawings of which.

DESCRIPTION OF EMBODIMENTS

In the following, embodiments of the present disclosure will be described with reference to the attached drawings.

As illustrated in FIGS. 1 to 4, an accelerator pedal apparatus of an embodiment includes a housing 10 fixed to a vehicle of an automobile and the like, an accelerator pedal 20 supported swingably about a predetermined axis line L1, a return spring 30 which exerts urging force to return the accelerator pedal 20 toward a rest position, a hysteresis generating mechanism 40 which generates hysteresis on pedaling force (i.e., a pedal load) while exerting urging force to return the accelerator pedal 20 toward the rest position, an accelerator position sensor (APS) 50 as an operation detector to detect a rotational angle position and a rotational direction of the accelerator pedal 20, a reaction force adding mechanism 60 which generates reaction force to return the accelerator pedal 20 toward the rest position under predetermined conditions, a control system 70 as controller to perform drive control of the reaction force adding mechanism 60, and the like. Here, the hysteresis generating mechanism 40 includes a first slider 41, a second slider 42, a return spring 43, and the like. The reaction force adding mechanism 60 includes a torque motor 61, a return lever 62, a motor position sensor (MPS) 63, and the like.

Figure 1:
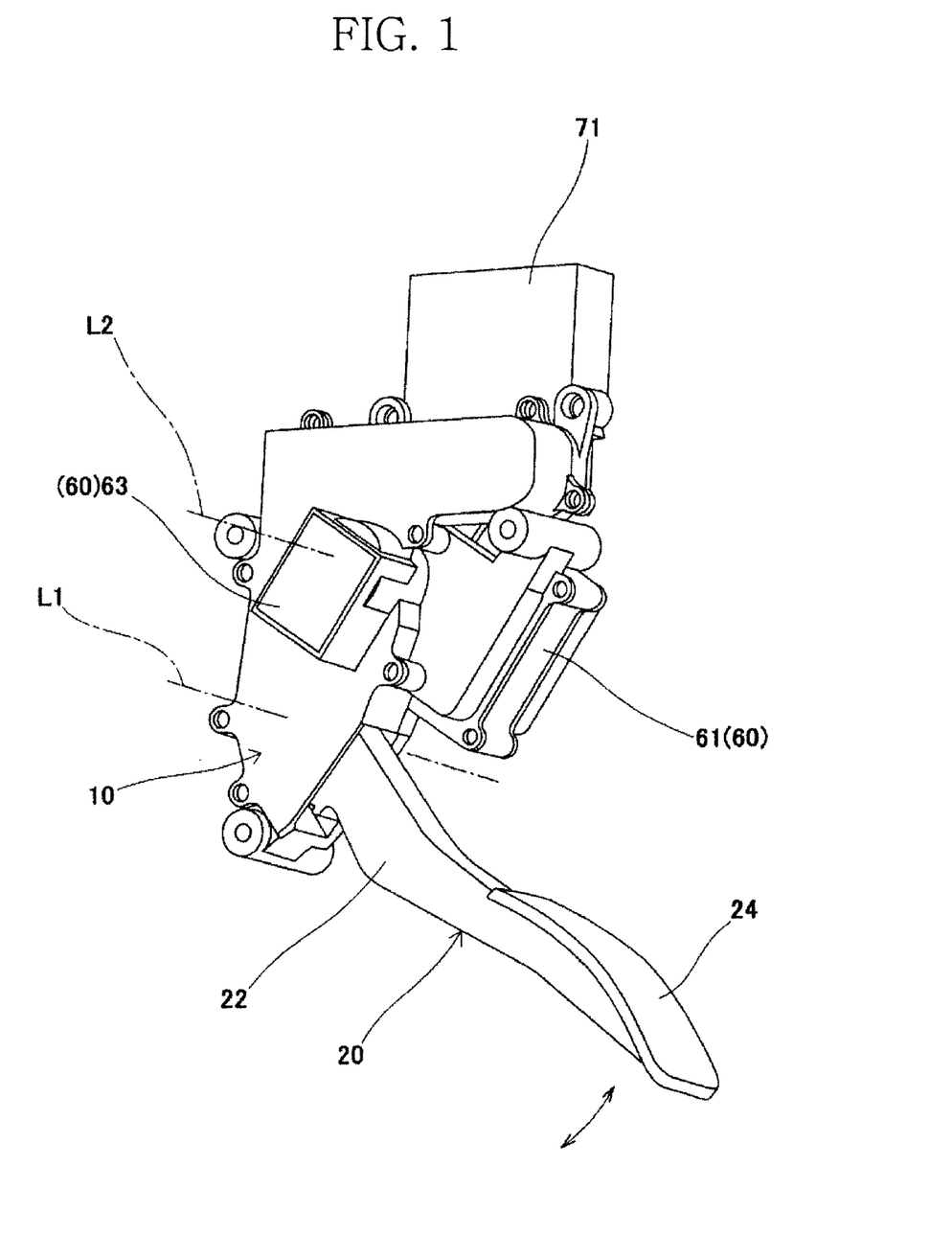
FIG. 1 is a perspective view of an accelerator pedal apparatus of an embodiment of the present disclosure.
Figure 2:
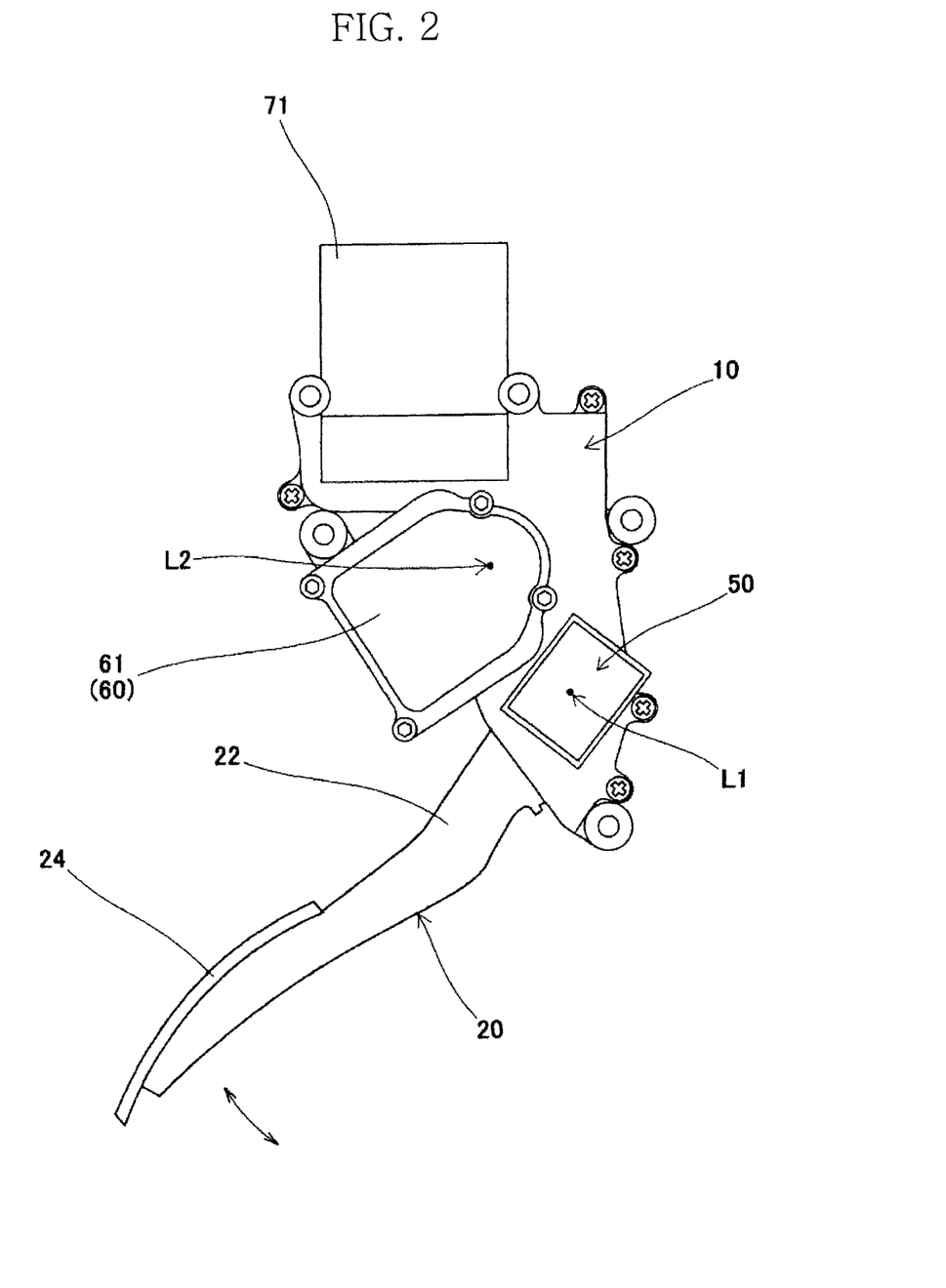
FIG. 2 is a side view illustrating the accelerator pedal apparatus of FIG. 1.
Figure 3:
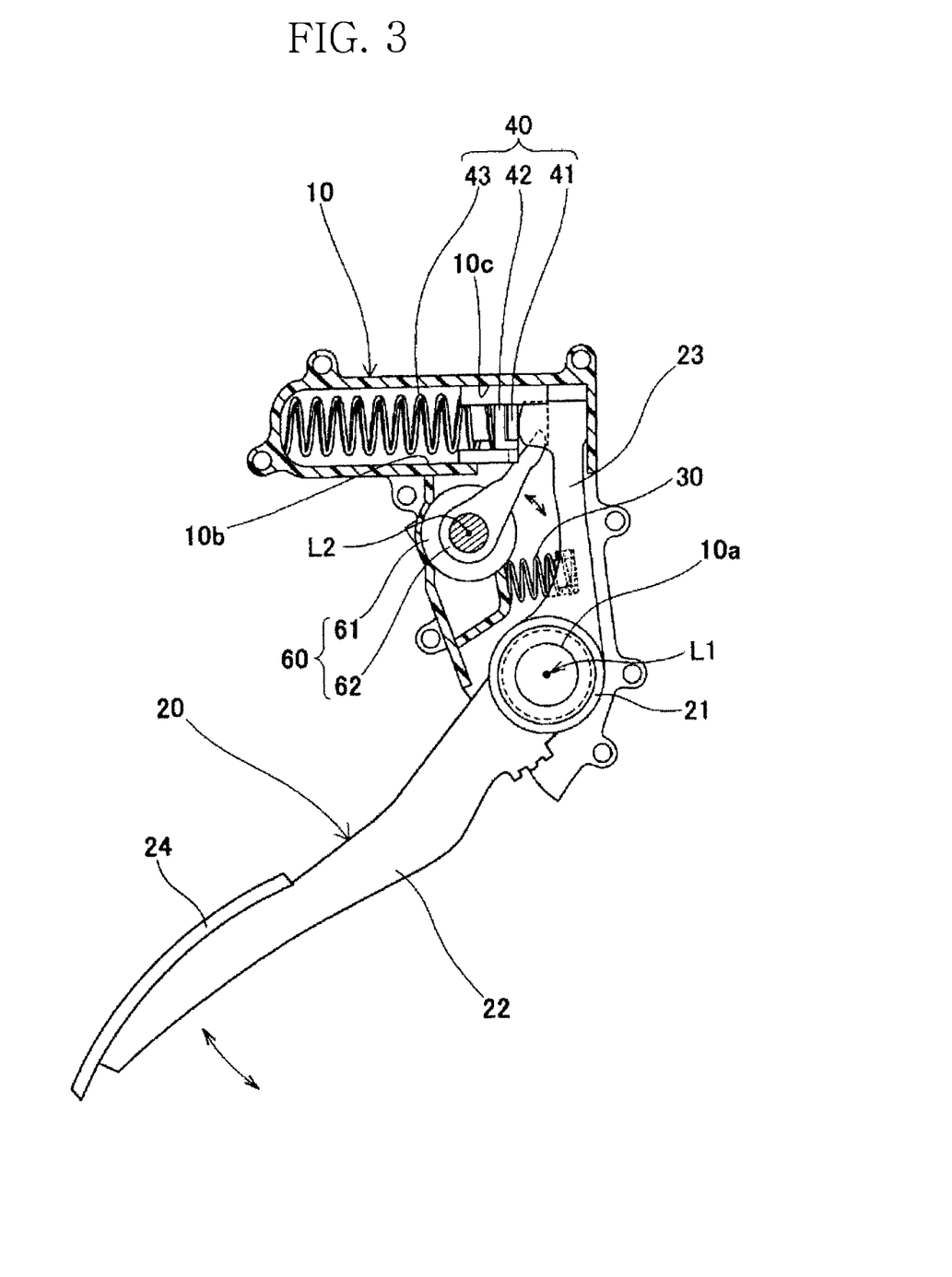
FIG. 3 is a side view illustrating an inner structure of the accelerator pedal apparatus of FIG. 1.

The housing 10 being formed of resin as a whole supports the accelerator pedal 20 swingably about an axis line L1, as illustrated in FIGS. 1 to 3. At the inside thereof, the return spring 30 and the hysteresis generating mechanism 40 are accommodated, the accelerator position sensor 50 is embedded around the axis line L1, and a later-mentioned control unit 71 which performs electric connection with the outside is embedded at an upper area thereof.

The accelerator pedal 20 being formed of resin as a whole includes a cylindrical portion 21 rotatably supported by a support shaft 10a of the housing 10, a lower arm portion 22 integrally formed as being extended downward from the cylindrical portion 21, an upper arm portion 23 integrally formed as being extended upward from the cylindrical portion 21, a pedal portion 24 integrally formed with the lower arm portion 22, and the like, as illustrated in FIGS. 1 to 3.

The upper arm portion 23 is formed to be engaged with a part (i.e., the first slider 41) of the hysteresis generating mechanism 40 and a part (i.e., the return lever 62) of the reaction force adding mechanism 60.

The return spring 30 is a compression type coil spring formed of spring steel and the like. As illustrated in FIG. 3, the return spring 30 is arranged in a state of being compressed to have a predetermined compression amount as one end part thereof being engaged with an inner wall of the housing 10 and the other end part thereof being engaged with a part of the accelerator pedal 20 (i.e., the upper arm portion 23). In this manner, the return spring 30 exerts urging force to the accelerator pedal 20 to return toward the rest position.

As illustrated in FIG. 3, the hysteresis generating mechanism 40 including the first slider 41, the second slider 42 and the return spring 43 which are accommodated in the housing 10 is structured to generate hysteresis on the pedaling force (i.e., the pedal load) as being engaged with an upper end part of the upper arm portion 23 of the accelerator pedal 20 in a disengageable manner.

The first slider 41 is formed of resin material (e.g., a material having high slidability such as oil-bearing polyacetal). As illustrated in FIG. 3, the first slider 41 slidably contacts to a lower inner wall face 10b of the housing 10 and includes an inclined face contacting to an inclined face of the second slider 42, an engaging face with which the upper end part of the upper arm portion 23 can be engaged in a disengageable manner, and the like.

The second slider 42 is formed of resin material (e.g., a material having high slidability such as oil-bearing polyacetal). As illustrated in FIG. 3, the second slider 42 slidably contacts to an upper inner wall face 10c of the housing 10 and includes the inclined face contacting to the inclined face of the first slider 41, a receiving face which receives one end part of the return spring 43, and the like.

The return spring 43 is a compression type coil spring formed of spring steel and the like. As illustrated in FIG. 3, the return spring 43 is arranged in a state of being compressed to have a predetermined compression amount as one end part thereof being engaged with the receiving face of the second slider 42 and the other end part thereof being engaged with an inner wall of the housing 10. In this manner, the return spring 43 pushes the inclined face of the second slider 42 to the inclined face of the first slider 41 so as to exert urging force to return the accelerator pedal 20 toward the rest position via the first slider 41 and the second slider 42 while exerting a wedge effect to push the first slider 41 and the second slider 42 respectively toward the lower inner wall face 10b and the upper inner wall face 10c.

Accordingly, when the accelerator pedal 20 is depressed toward the maximum depression position (i.e., the full-open position) against the urging force of the return spring 30 (and the return spring 43), the upper arm portion 23 pushes the first slider 41 leftward in FIG. 3 against the urging force of the return spring 43. Thus, friction force (i.e., slide resistance) generated by the wedge effect of the first slider 41 and the second slider 42 is increased. Here, the friction force is increased linearly with increase of the urging force of the return spring 43, so that a characteristic line DNL at the depression side of the hysteresis characteristic indicated by a solid line NL in FIG. 5 can be obtained.

On the other hand, when the accelerator pedal 20 is returned toward the rest position in accordance with the urging force of the return spring 30 (and the return spring 43), the friction force (i.e., the slide resistance) generated by the wedge effect of the first slider 41 and the second slider 42 is decreased. Here, the friction force is decreased linearly with decrease of the urging force of the return spring 43 as the first slider 41 and the second slider 42 are moved rightward in FIG. 3 toward the original position thereof, so that a characteristic line RNL at the return side of the hysteresis characteristic indicated by the solid line NL in FIG. 5 can be obtained.

Figure 5:
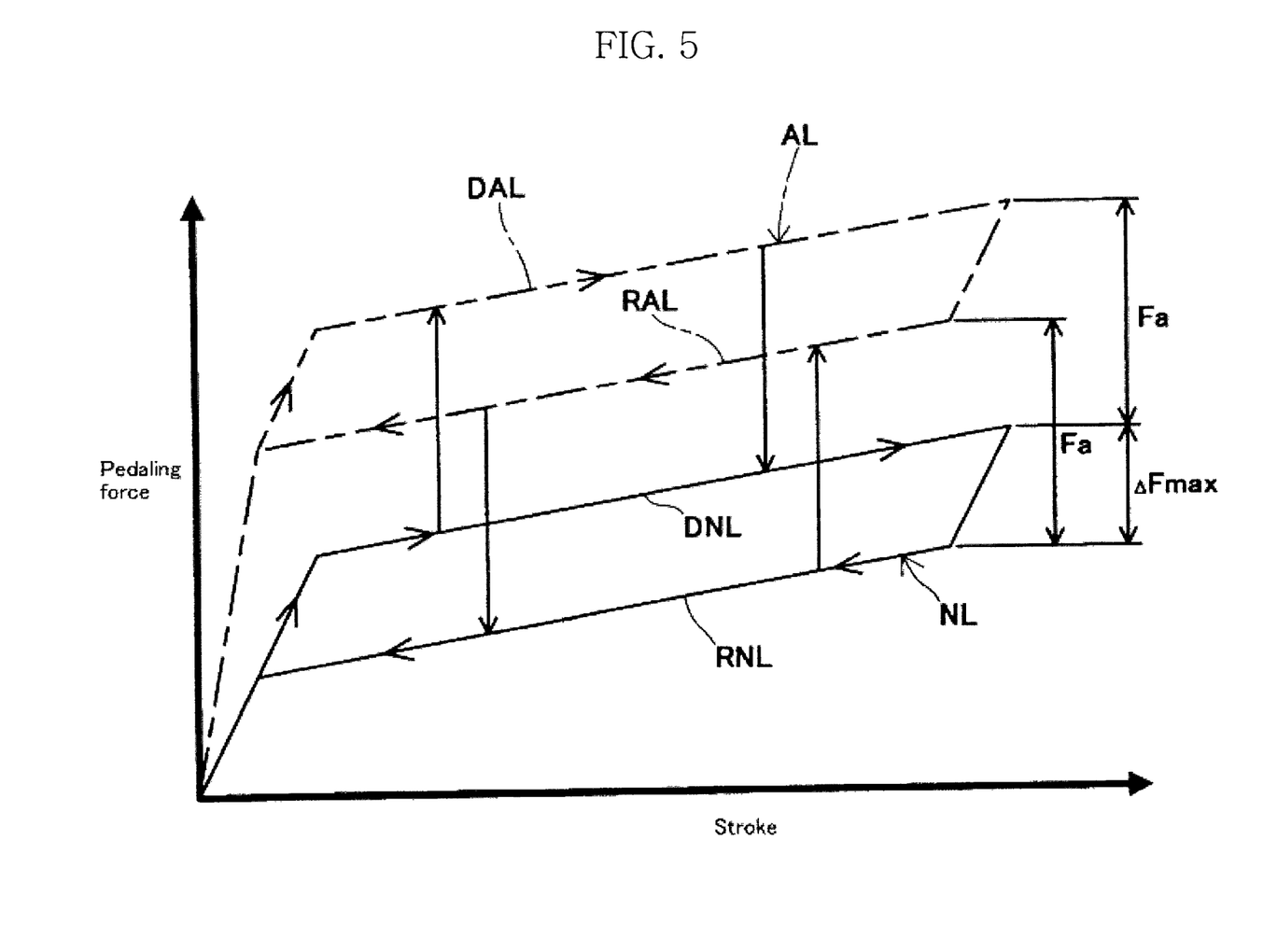
FIG. 5 is a characteristic graph indicating hysteresis characteristics of pedaling force with the accelerator pedal apparatus of FIG. 1.

Since the friction force during return operation is smaller than the friction force during depression operation, hysteresis (indicted by the solid line NL) can be generated on the pedaling force (i.e., the pedal load) entirely between the depression operation and the return operation.

Here, even in a case that the first slider 41 stops with sticking in a midway of the return operation, the upper arm portion 23 is to be apart from the first slider 41 owing to the urging force of the return spring 30, and accordingly, the accelerator pedal 20 is to be returned to the rest position.

As illustrated in FIG. 2, the accelerator position sensor (APS) 50 is arranged at the cylindrical portion 21 of the accelerator pedal 20 and a sensor accommodating portion of the housing 10.

The accelerator position sensor 50 is a non-contact type magnetic sensor, for example, and is provided with a circular armature made of magnetic material arranged at the area of the cylindrical portion 21 of the accelerator pedal 20, a pair of arc-shaped permanent magnets connected to an inner circumferential face of the armature, two stators made of magnetic material embedded in the housing 10, two Hall elements arranged between the two stators, and the like. A circuit board having terminals and various electric components mounted is provided as a component relating thereto.

Then, when the accelerator pedal 20 is rotated (i.e., swung), the accelerator position sensor 50 detects variation of magnetic flux density with the Hall elements and outputs as a voltage signal. Then, the accelerator pedal 20 is detected whether being in the depression operation or in the return operation based on a variation amount of the voltage signal while detecting the angle position of the accelerator pedal 20.

As illustrated in FIGS. 1 to 3, the reaction force adding mechanism 60 is provided with the torque motor 61 which is accommodated in the housing 10, the return lever 62 which is engaged with the upper arm portion 23 of the accelerator pedal 20 in a disengageable manner as being directly connected to the torque motor 61, the motor position sensor (MPS) 63 which detects a rotational angle of the return lever 62 as being accommodated in a sensor accommodating portion of the housing 10, and the like.

The torque motor 61 integrally rotates the directly-connected return lever 62 about the axis line L2 within a predetermined angle range in a reciprocated manner. Here, the torque motor 61 is adopted as a drive source. However, not limited to a torque motor, any drive source having another structure may be adopted as long as being capable of rotating the return lever 62 against pedaling force of the accelerator pedal 20.

As illustrated in FIG. 3, the return lever 62 is formed so that the top end part thereof is engaged with the upper arm portion 23 of the accelerator pedal 20 in a disengageable manner as being directly connected to a rotation shaft of the torque motor 61 rotating about the axis line L2.

When drive force (i.e., rotational torque) is not exerted by the torque motor 61, the return lever 62 is freely rotated to follow swinging of the accelerator pedal 20, that is, to follow without exerting resistant force to movement of the upper arm portion 23. On the other hand, when the drive force (i.e., the rotational torque) is exerted by the torque motor 61, the return lever 62 exerts reaction force to the upper arm portion 23 to push back the accelerator pedal 20 toward the rest position against the pedaling force.

As illustrated in FIG. 1, the motor position sensor (MPS) 63 is arranged at the sensor accommodating portion of the housing 10 to detect an angle position of the torque motor 61, that is, an angle position of the return lever 62. Here, the motor position sensor (MPS) 63 may adopt a contact-type or non-contact type sensor.

Here, since the reaction force adding mechanism 60 is structured with the torque motor 61, the return lever 62 and the motor position sensor 63, simplification of the reaction force adding mechanism 60 and miniaturization of the apparatus can be achieved and response can be improved in a case that control to add reaction force is required in predetermined conditions.

Figure 4:
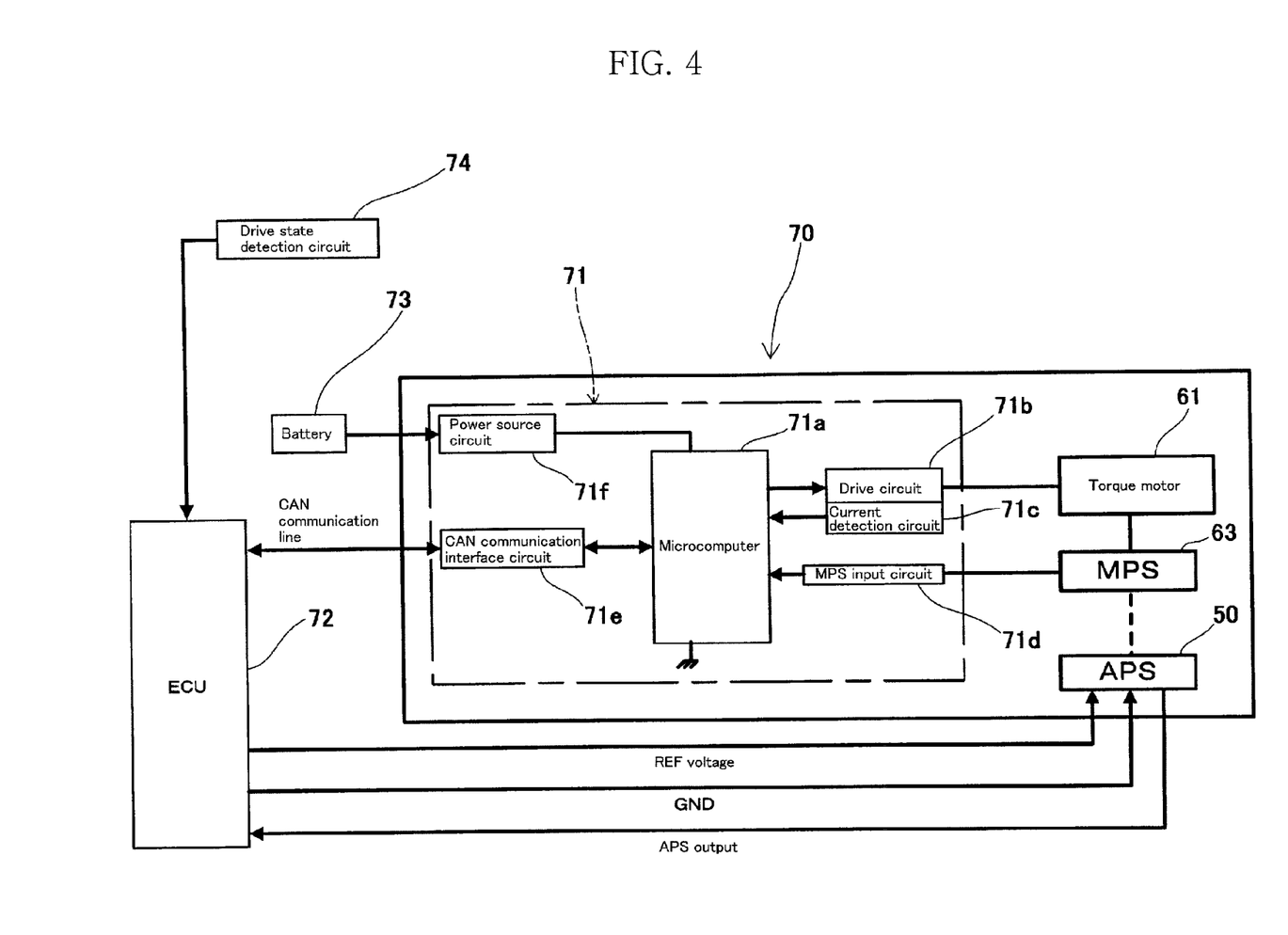
FIG. 4 is a block diagram illustrating a control system which performs drive control of a reaction force adding mechanism included in the accelerator pedal apparatus of FIG. 1.

As illustrated in FIG. 4, the control system 70 includes a control unit 71 embedded in the housing 10, an ECU 72 which performs overall control as being mounted on a vehicle, a battery 73 mounted on the vehicle, a drive state detection circuit 74 as drive state detector which detects various drive states of the vehicle or an engine, and the like.

The control unit 70 is embedded at an upper area of the housing 10 and is provided with a microcomputer (i.e., a chip) 71a which performs control, a drive circuit 71b which drives the torque motor 61 based on a control signal of the microcomputer 71a, a current detection circuit 71c which detects drive current to drive the torque motor 61, an MPS input circuit 71d which transmits a detection signal of the motor position sensor (MPS) 63, an interface circuit 71e which performs transmitting and receiving of signals (i.e., data) between the microcomputer 71a and the ECU 72 owing to controller area network (CAN) communication, and a power source circuit 71f which supplies power to the microcomputer 71a. Further, the accelerator position sensor (APS) 50 is connected to the ECU 72 to transmit the detection signal thereto.

The drive state detection circuit 74 detects various drive information such as vehicle speed, engine speed, distance against a vehicle in front, road surface information and a drive mode.

When the various drive information is detected by the drive state detection circuit 74, the reaction force adding mechanism 60 is controlled to be appropriately driven via the ECU 72 and the control unit 71 so that danger avoidance and danger notification are quickly performed in an appropriate state without providing a feeling of strangeness to a driver, and further, that fuel consumption is reduced.

In the following, drive control of the reaction force adding mechanism 60 to be performed by the control system 70 will be described.

The control system 70 performs drive control of the reaction force adding mechanism 60 based on the detection information of the drive state detection circuit 74 to add reaction force during depressing of the accelerator pedal 20 under predetermined conditions and to add reaction force as well during returning of the accelerator pedal 20 under predetermined conditions.

When reaction force is added over the entire range of the accelerator pedal 20 during depression operation and return operation, the pedaling force is provided with the hysteresis characteristic as indicated by a dashed-dotted line AL (including a depression side characteristic line DAL and a return side characteristic line RAL) in FIG. 5. That is, in this characteristic, reaction force Fa is added in whole to a normal hysteresis characteristic indicated by a solid line NL (including a depression side characteristic line DNL and a return side characteristic line RNL) to which reaction force is not added.

According to the above, it is possible to obtain pedaling force with hysteresis caused by the hysteresis generating mechanism 40 when the accelerator pedal 20 is swung between the rest position and the maximum depression position as being operated by a driver. In addition, under predetermined conditions (for example, in a case that danger avoidance, danger notification or the like is required such that distance against a vehicle running in front becomes short during vehicle driving), it is possible to generate reaction force (i.e., push-back force) to push back the accelerator pedal 20 against pedaling force even during return operation as well as during depression operation by the driver.

Accordingly, it is possible to quickly avoid danger as assisting return operation by adding reaction force during the return operation of the accelerator pedal 20 in a case that returning of the accelerator pedal 20 is slow, that a return amount is insufficient, or the like.

Further, the control system 70 performs drive control of the reaction force adding mechanism 60 to add reaction force (e.g., the reaction force Fa added at the maximum depression position) which is to be larger than the difference (e.g., the difference ΔFmax at the maximum depression position) between pedaling force at the depression side (indicated by the characteristic line DNL) and pedaling force at the return side (indicated by the characteristic line RNL) of the pedaling force hysteresis characteristic.

According to the above, in a case that reaction force is added during depression operation of the accelerator pedal 20 (along the characteristic line DNL at the depression side of the pedaling force hysteresis characteristic), the pedaling force follows the characteristic line RAL at the return side of the hysteresis characteristic to which reaction force is added regardless of being during depression operation as the accelerator pedal 20 being slightly returned by the reaction force. Here, if the added reaction force is smaller than the difference between the pedaling force at the depression side and the pedaling force at the return side, pedaling force on the pedaling force characteristic line RAL at the return side to which reaction force is added becomes smaller than pedaling force on the pedaling force characteristic line DNL at the depression side to which reaction force is not added. In this case, there may be a fear that a reaction force feeling cannot be clearly recognized by a driver. In contrast, according to the present embodiment, since reaction force Fa being larger than the difference (ΔFmax) between the pedaling force at the depression side and the pedaling force at the return side is added as illustrated in FIG. 5, the pedaling force becomes larger than the pedaling force at the depression side to which reaction force is not added at the position of the accelerator opening (i.e., the accelerator stroke). Accordingly, the reaction force feeling can be clearly recognized by a driver.

Figure 6A:
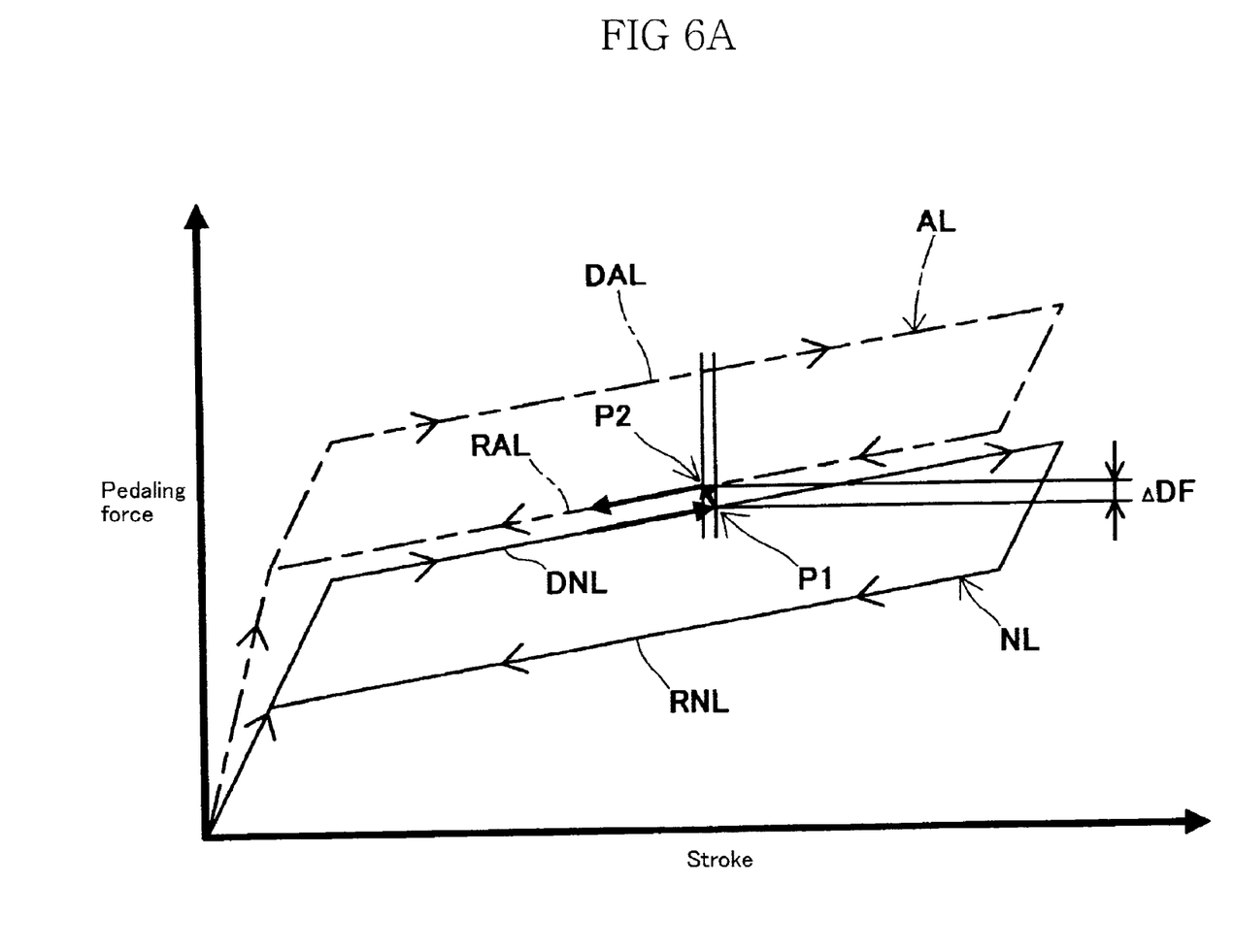
FIGS. 6A and 6B are characteristic graphs indicating hysteresis characteristics of pedaling force with the accelerator pedal apparatus of FIG. 1.
Figure 6B:
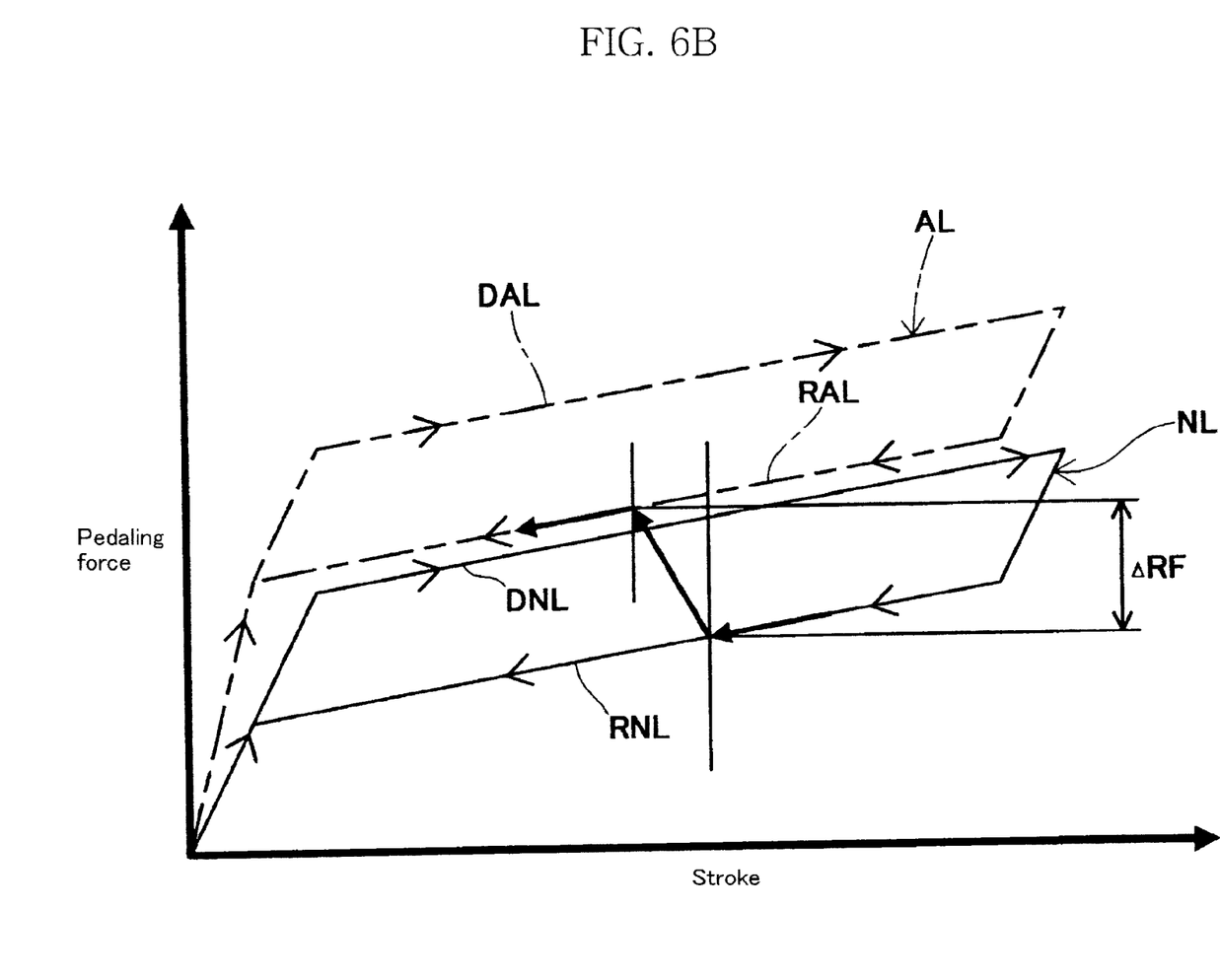

Further, as illustrated in FIGS. 6A and 6B, in the accelerator pedal apparatus having the hysteresis generating mechanism 40, in a case that reaction force is added during depression operation of the accelerator pedal 20 (at point P1 in FIG. 6A), the pedaling force follows the characteristic line RAL at the return side of the hysteresis characteristic (indicated by the dashed-dotted line AL) to which reaction force is added (i.e., the pedaling force is moved to point P2 in FIG. 6A) regardless of being during depression operation as the accelerator pedal 20 being slightly returned by the reaction force.

Here, if the reaction force to be added during depression operation is equal to the reaction force to be added during return operation, it is difficult for a driver to recognize the added reaction force with slight push-back of the accelerator pedal 20. In addition, since the reaction force ADF to be felt as being added during depression operation is smaller than the reaction force ΔRF to be felt as being added during return operation as illustrated in FIGS. 6A and 6B, there is a fear that a feeling of strangeness is provided to the driver.

Figure 7A:
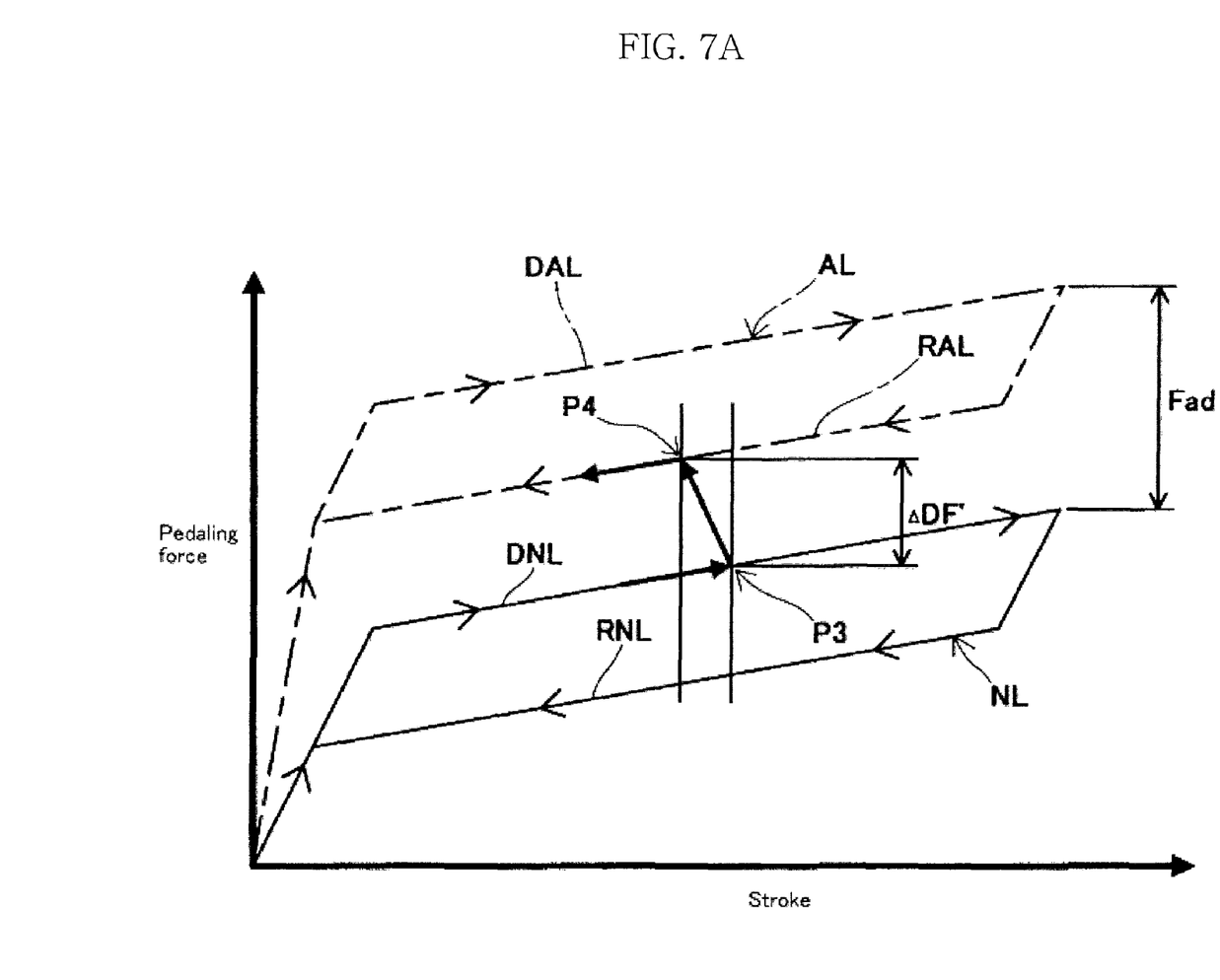
FIGS. 7A and 7B are characteristic graphs indicating hysteresis characteristics of pedaling force with the accelerator pedal apparatus of FIG. 1.
Figure 7B:
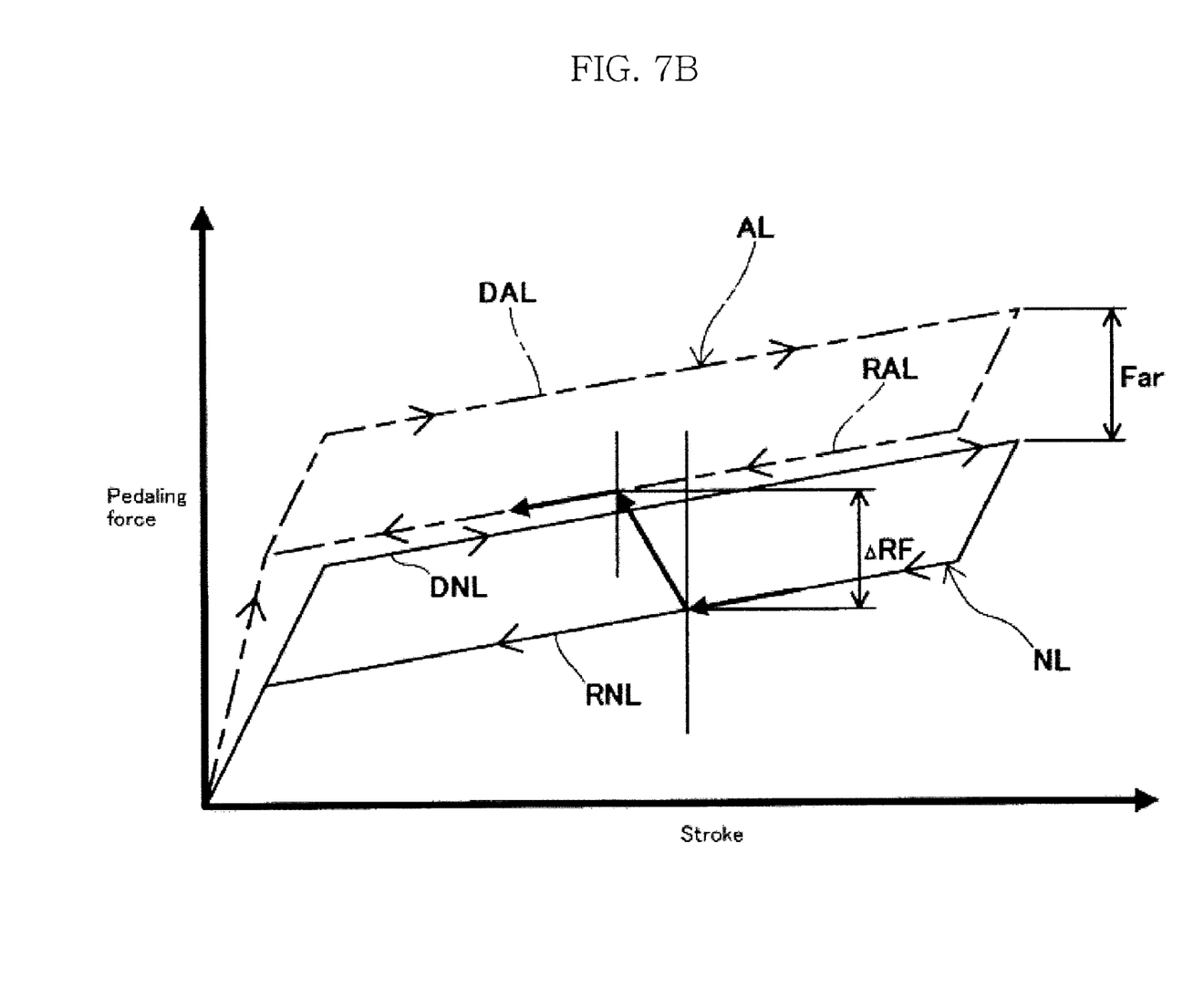

Hence, as illustrated in FIGS. 7A and 7B, the control system 70 performs drive control of the reaction force adding mechanism 60 so that the reaction force Fad to be added during depression operation of the accelerator pedal 20 is larger than the reaction force Far to be added during return operation of the accelerator pedal 20.

According to the above, in a case that reaction force is added during depression operation of the accelerator pedal 20 (at point P3 in FIG. 7A), the pedaling force follows the characteristic line RAL at the return side of the hysteresis characteristic (indicated by a dashed-dotted line AL) to which reaction force added (i.e., the pedaling force is moved to point P4 in FIG. 7A) as the accelerator pedal 20 being returned with the reaction force by a larger amount than that in a case indicated in FIG. 6A.

At that time, the push-back force (i.e., the reaction force) to the accelerator pedal 20 can be reliably felt by a driver. Further, since the reaction force ΔDF' to be felt as being added during depression operation is approximately the same as the reaction force ΔRF to be felt as being added during return operation as illustrated in FIGS. 7A and 7B, appropriate accelerator feeling can be actualized without providing a feeling of strangeness to the driver.

Further, after adding the reaction force, the control system 70 determines whether or not reaction force is to be further added based on operational information (i.e., being in depression operation or return operation) of the accelerator pedal 20 obtained by the accelerator position sensor 50. When it is determined that reaction force is required to be further added, the control system 70 performs drive control of the reaction force adding mechanism 60 to further add predetermined reaction force.

That is, drive control of the reaction force adding mechanism 60 is performed as follows. When the accelerator pedal 20 is operated to be returned after the reaction force is added, reaction force is not to be further added. In contrast, when the accelerator pedal 20 is further depressed even after the reaction force is added, reaction force is to be further added. Accordingly, it is possible to sufficiently perform danger avoidance or to continuously perform danger notification.

In this manner, operation of the accelerator pedal 20 is determined whether being depression operation or being return operation based on the detection information of the accelerator position sensor 50, and then, reaction force adding is performed by the reaction force adding mechanism 60 based on the determination result. Therefore, operation of the accelerator pedal 20 can be directly reflected to reaction force adding control, so that reaction force can be accurately added at desired timing respectively during depression operation and return operation of the accelerator pedal 20.

Regarding increase and decrease of reaction force, magnitude of the required reaction force is appropriately set owing to that drive current of the torque motor 61 is appropriately adjusted by the control system 70.

Thus, since the torque motor 61 is adopted for the reaction force adding mechanism 60, reaction force can be added with a simple control method while achieving structural simplification and the like.

As described above, since the control system 70 appropriately performs drive control of the reaction force adding mechanism 60 based on the various drive information (such as vehicle speed, engine speed, distance against a vehicle in front, road surface information and a drive mode) detected by the drive state detection circuit 74, it is possible that danger avoidance and danger notification are quickly performed in an appropriate state and that fuel consumption is reduced without providing a feeling of strangeness to a driver.

Next, operation of the accelerator pedal apparatus will be described.

First, when the accelerator pedal 20 is in a state of not being depressed by a driver, the accelerator pedal 20 remains stopped at the rest position owing to urging force of the return spring 30.

When the driver depresses the accelerator pedal 20 from this state, the accelerator pedal 20 is rotated counterclockwise in FIG. 3 against the urging force of the return spring 30 to be stopped as being abutted to the predetermined stopper until being rotated to the maximum depression position (i.e., the full-open position) while the resistant load (i.e., the push-back load) generated by the hysteresis generating mechanism 40 is increased. In this depression operation, the return lever 62 follows movement of the upper arm portion 23 without exerting any load (i.e., push-back force).

On the other hand, when the driver releases pedaling force, the accelerator pedal 20 is moved toward the rest position with the urging force of the return spring 30 and is stopped as being abutted to a predetermined stopper while exerting a resistant load (i.e., a pedal load) which is smaller than the resistant load (i.e., the pedal load) during depression operation. In this return operation, the return lever 62 follows movement of the upper arm portion 23 as being pushed by the first slider 41 without exerting any load (i.e., push-back force).

Here, when the accelerator pedal 20 is in depression operation as being depressed by the driver, for example, in a state of being determined that danger avoidance or danger notification is necessary (that is, under predetermined conditions), the torque motor 61 of the reaction force adding mechanism 60 is activated and drive control thereof is performed based on the control signal of the control system 70 to add the reaction force Fad being larger than the reaction force Far which is added during return operation so that the upper arm portion 23 of the accelerator pedal 20 is to be pushed back toward the rest position against pedaling force of the driver with clockwise rotational torque (i.e., push-back force) in FIG. 3 generated by the return lever 62. Accordingly, it is possible for the driver to reliably feel the reaction force and to immediately recognize a dangerous situation and the like.

On the other hand, when the accelerator 20 pedal is in return operation as being returned by the driver, for example, in a state of being determined that danger avoidance of danger notification is necessary (that is, under predetermined conditions), the torque motor 61 of the reaction force adding mechanism 60 is activated and drive control thereof is performed based on the control signal of the control system 70 to add the reaction force Far so that the upper arm portion 23 of the accelerator pedal 20 is to be pushed back toward the rest position against pedaling force of the driver with clockwise rotational torque (i.e., push-back force) in FIG. 3 generated by the return lever 62. Accordingly, it is possible for the driver to reliably feel the reaction force and to immediately recognize a dangerous situation and the like.

As described above, under predetermined conditions (i.e., in a case that danger avoidance or danger notification is required such that distance against a vehicle in front becomes short during vehicle driving, for example), reaction force (i.e., push-back force) to push back the pedal arm 20 against pedaling force is generated even during return operation as well as during depression operation while the reaction force adding mechanism 60 is appropriately driven by the control system 70. Accordingly, it is possible to quickly avoid danger as assisting return operation of the accelerator pedal 20 in a case that returning of the accelerator pedal 20 is slow, that a return amount is insufficient, or the like.

Here, since the return lever 62 is disengageable from the upper arm portion 23 of the accelerator pedal 20, returning of the accelerator pedal 20 to a safety side (i.e., to the rest position) can be reliably guaranteed even if failure occurs at the reaction force adding mechanism 60. Further, since the return spring 30 exerts urging force directly, returning of the accelerator pedal 20 to the safety side (i.e., to the rest position) can be reliably guaranteed even in failure occurs at the hysteresis generating mechanism 40 and the reaction force adding mechanism 60.

In the above embodiment, the reaction force adding mechanism 60 is described as being structured with the torque motor 61, the return lever 62, and the motor position sensor (MPS) 63. However, not limited thereto, another mechanism may be adopted as long as being capable of adding predetermined reaction force.

Further, in the above embodiment, the hysteresis generating mechanism 40 is described as being structured with the first slider 41, the second slider 42, and the return spring 43. However, not limited thereto, another mechanism may be adopted as long as being capable of generating predetermined hysteresis on pedaling force.

Furthermore, in the above embodiment, the accelerator pedal 20 is described as being swingably supported by the support shaft in the housing 10. However, not limited thereto, it is possible to adopt an accelerator pedal which includes a pedal swingably supported by a floor face of a vehicle and the like, a pedal arm which is swingably supported by a support shaft of a housing, a linkage mechanism which interlocks the pedal and the pedal arm, and the like.

As described above, according to the accelerator pedal apparatus of the present disclosure, danger avoidance or danger notification can be quickly performed during operation (i.e., depression operation and return operation) of an accelerator pedal and appropriate accelerator feeling can be obtained without providing a feeling of strangeness to a driver when reaction force is added. Accordingly, the present disclosure is useful not only for automobiles but also for motorcycles, work vehicles, other vehicles, and the like.

Although a few embodiments have been shown and described, it would be appreciated by those skilled in the art that changes may be made in these embodiments without departing from the principles and spirit of the invention, the scope of which is defined in the claims and their equivalents.

DESCRIPTION OF NUMERALS

L1 Axis line
L2 Axis line
10 Housing
10a Support shaft
10b Lower inner wall face
10c Upper inner wall face
20 Accelerator pedal
21 Cylindrical portion
22 Lower arm portion
23 Upper arm portion
24 Pedal portion
30 Return spring
40 Hysteresis generating mechanism
41 First slider
42 Second slider
43 Return spring
50 Accelerator position sensor (Operation detector)
60 Reaction force adding mechanism
61 Torque motor
62 Return lever
63 Motor position sensor
70 Control system (Controller)
71 Control unit (Controller)
71a Microcomputer
71b Drive circuit
71c Current detection circuit
71d MPS input circuit
71e Interface circuit
71f Power source circuit
72 ECU
73 Battery
74 Drive state detection circuit (Drive state detector)

What is claimed is:

1. An accelerator pedal apparatus, comprising:
   an accelerator pedal;
   a hysteresis generating mechanism to generate hysteresis in response to pedaling force applied to the accelerator pedal;
   a reaction force adding mechanism to add reaction force in a state of having the hysteresis generated by the hysteresis generating mechanism to push back the accelerator pedal toward a rest position; and
   a controller to perform drive control of the reaction force adding mechanism;
   wherein the controller is configured to perform drive control of the reaction force adding mechanism so that reaction force is added during depressing of the accelerator pedal under a predetermined condition and reaction force is added during returning of the accelerator pedal under the predetermined condition as the reaction force being quantity of the hysteresis is added to the quantity of the reaction force to be felt as being added during return operation.

2. The accelerator pedal apparatus according to claim 1, wherein the controller performs drive control of the reaction force adding mechanism so that reaction force to be added during depressing of the accelerator pedal is larger than reaction force to be added during returning of the accelerator pedal.

3. The accelerator pedal apparatus according to claim 2, wherein the controller determines after the reaction force is added whether or not reaction force is to be further added based on operational information of the accelerator pedal.

4. The accelerator pedal apparatus according to claim 3, wherein the hysteresis generating mechanism including a first slider, a second slider and a return spring;
   the reaction force adding mechanism includes a torque motor, a return lever and a motor position sensor, the torque motor exerting a rotational torque to push back the accelerator pedal as being engaged therewith; and
   the controller appropriately sets reaction force magnitude by adjusting drive current of the torque motor.

5. The accelerator pedal apparatus according to claim 3, further comprising an operation detector which detects operation of the accelerator pedal,
   wherein the controller determines based on output information of the operation detector whether the accelerator pedal is in depression operation or return operation and performs drive control of the reaction force adding mechanism.

6. The accelerator pedal apparatus according to claim 3, further comprising drive state detector which detects a vehicle drive state or an engine drive state,
   wherein the controller performs drive control of the reaction force adding mechanism based on detection information of the drive state detector.

7. The accelerator pedal apparatus according to claim 2, wherein the hysteresis generating mechanism including a first slider, a second slider and a return spring;

the reaction force adding mechanism includes a torque motor, a return lever and a motor position sensor, the torque motor exerting a rotational torque to push back the accelerator pedal as being engaged therewith; and the controller appropriately sets reaction force magnitude by adjusting drive current of the torque motor.

8. The accelerator pedal apparatus according to claim 2, further comprising an operation detector which detects operation of the accelerator pedal, wherein the controller determines based on output information of the operation detector whether the accelerator pedal is in depression operation or return operation and performs drive control of the reaction force adding mechanism.

9. The accelerator pedal apparatus according to claim 2, further comprising drive state detector which detects a vehicle drive state or an engine drive state, wherein the controller performs drive control of the reaction force adding mechanism based on detection information of the drive state detector.

10. The accelerator pedal apparatus according to claim 1, wherein the hysteresis generating mechanism including a first slider, a second slider and a return spring;

the reaction force adding mechanism includes a torque motor, a return lever and a motor position sensor, the torque motor exerting a rotational torque to push back the accelerator pedal as being engaged therewith; and the controller appropriately sets reaction force magnitude by adjusting drive current of the torque motor.

11. The accelerator pedal apparatus according to claim 10, further comprising an operation detector which detects operation of the accelerator pedal, wherein the controller determines based on output information of the operation detector whether the accelerator pedal is in depression operation or return operation and performs drive control of the reaction force adding mechanism.

12. The accelerator pedal apparatus according to claim 10, further comprising drive state detector which detects a vehicle drive state or an engine drive state, wherein the controller performs drive control of the reaction force adding mechanism based on detection information of the drive state detector.

13. The accelerator pedal apparatus according to claim 1, further comprising an operation detector which detects operation of the accelerator pedal, wherein the controller determines based on output information of the operation detector whether the accelerator pedal is in depression operation or return operation and performs drive control of the reaction force adding mechanism.

14. The accelerator pedal apparatus according to claim 13, further comprising drive state detector which detects a vehicle drive state or an engine drive state, wherein the controller performs drive control of the reaction force adding mechanism based on detection information of the drive state detector.

15. The accelerator pedal apparatus according to claim 1, further comprising drive state detector which detects a vehicle drive state or an engine drive state, wherein the controller performs drive control of the reaction force adding mechanism based on detection information of the drive state detector.

* * * * *